United States Patent [19]

Riccius et al.

[11] 3,877,665
[45] Apr. 15, 1975

[54] FUSELAGE CONFIGURATION

[75] Inventors: Rolf Riccius, Worpswede; Herbert Sadowski, Bremen, both of Germany

[73] Assignee: Vereinigte Flugtechnische Werke-Fokker GmbH, Bremen, Germany

[22] Filed: Mar. 16, 1973

[21] Appl. No.: 341,945

Related U.S. Application Data

[63] Continuation of Ser. No. 70,671, Sept. 9, 1970, abandoned.

[30] Foreign Application Priority Data

Sept. 9, 1969 Germany.............................. 1945518

[52] U.S. Cl. ............................................. 244/130
[51] Int. Cl. ............................................. B64c 1/00
[58] Field of Search............ 244/130, 125; D71/1 N, D71/1 F

[56] References Cited
UNITED STATES PATENTS

| | | |
|---|---|---|
| 3,030,051 | 4/1962 | Kerry et al. ....................... D71/1 N |
| 3,476,336 | 11/1969 | Hertel ................................ 244/130 |
| D190,534 | 6/1961 | Smolinski........................... D71/1 N |
| D195,014 | 4/1963 | Guadagnini et al. ............... D71/1 N |
| D218,786 | 9/1970 | Studer................................. D71/1 N |

Primary Examiner—Trygve M. Blix
Assistant Examiner—Gregory W. O'Connor
Attorney, Agent, or Firm—Spencer & Kaye

[57] ABSTRACT

A fuselage configuration for aircraft flying at high subsonic speeds is constructed of a first portion defined by a portion of the surface of a respective three-dimensional, spindle-shaped geometrical construction, the major axis of which is large relative to the minor axis, and a second portion defined by a portion of the surface of a respective three-dimensional, spindle-shaped geometrical construction, the major axis of which is also large relative to the minor axis. The two portions are arranged with respect to one another so that the area of the combined cross sections of the portions continuously increases in the direction of the longitudinal axis of the fuselage from each end until it reaches a maximum at a point between the ends.

3 Claims, 14 Drawing Figures

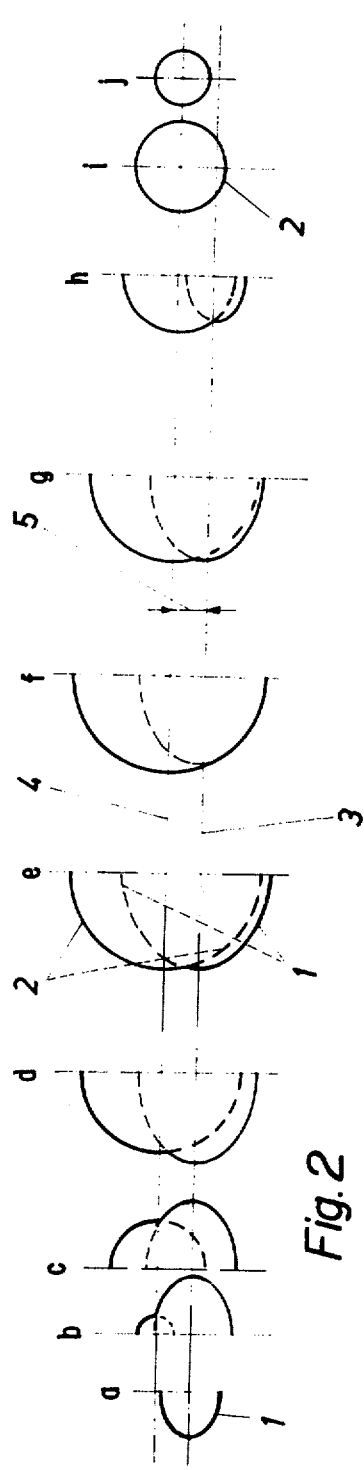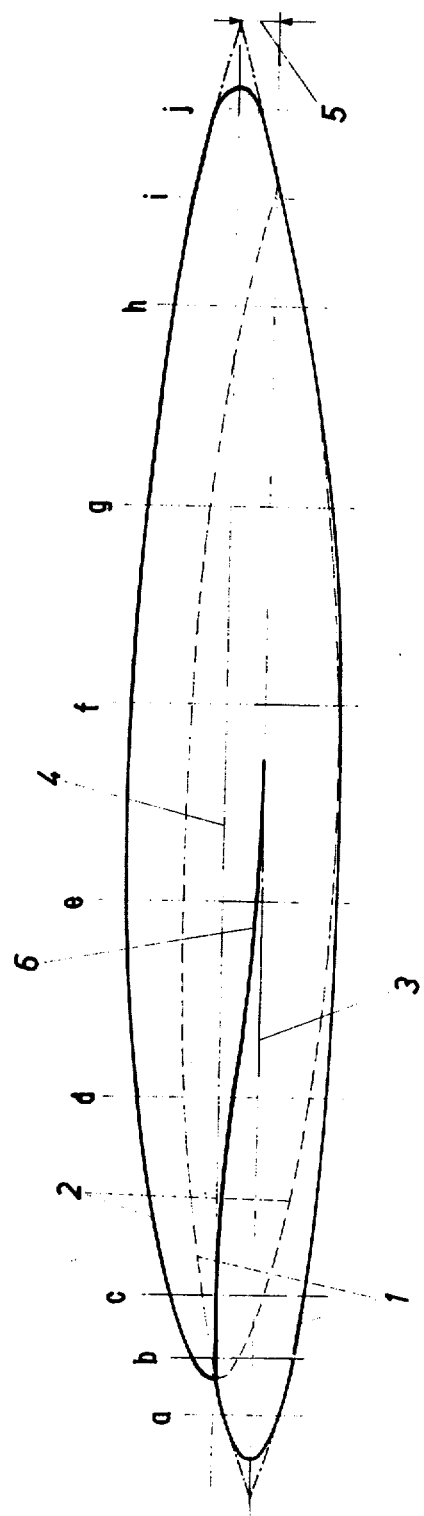

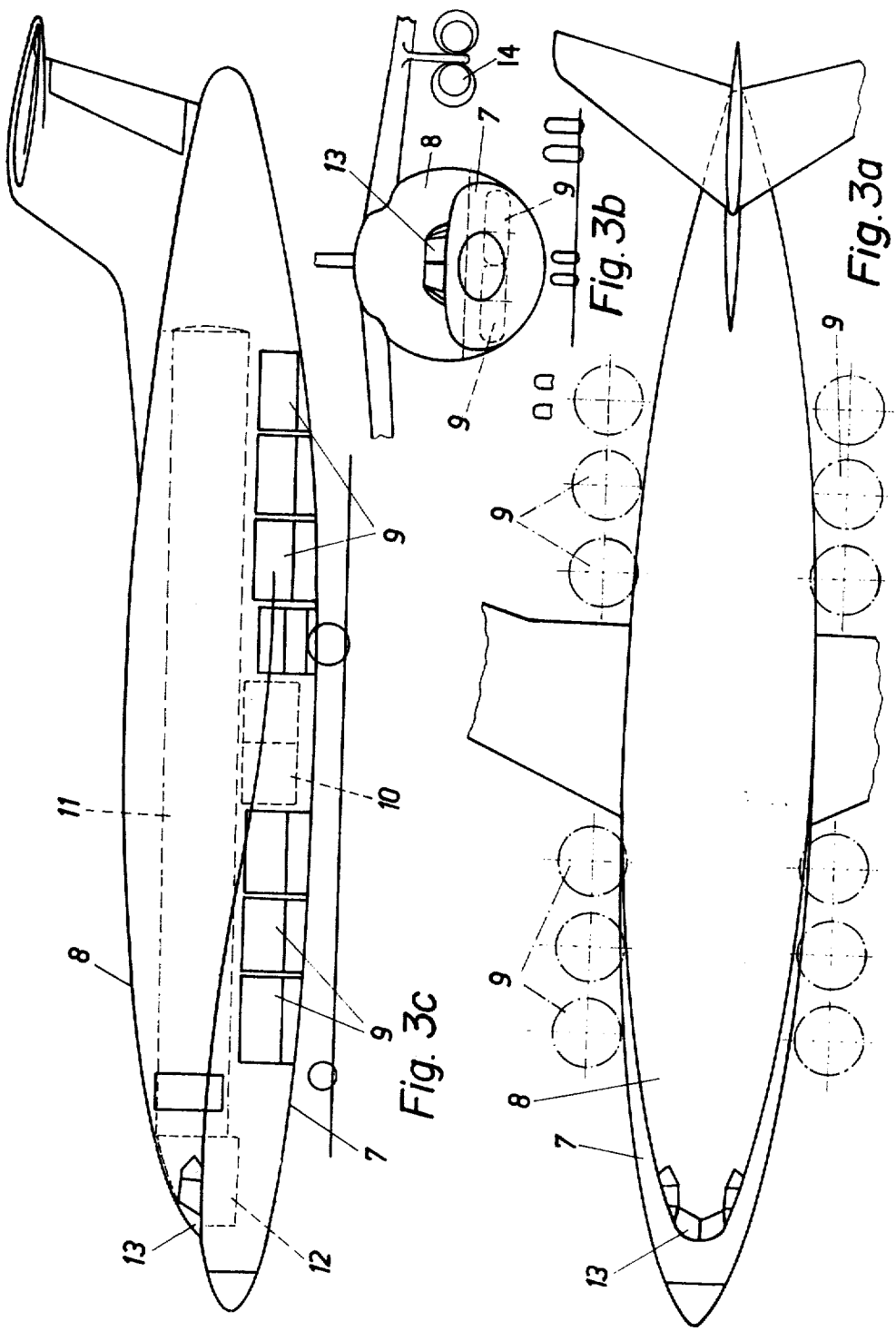

FUSELAGE CONFIGURATION

CROSS REFERENCE TO RELATED APPLICATION

This application is a continuation of application Ser. No. 70,671, filed Sept. 9, 1970, now abandoned.

BACKGROUND OF THE INVENTION

The present invention relates to a fuselage configuration which is particularly suited for aircraft flying at high subsonic speeds and is constructed from a plurality of elements of either identical or different configuration.

When designing the fuselage configuration of modern transport aircraft, the problem arises to effectively combine the requirements of providing maximum space utilization and favorable aerodynamic characteristics. When flying at high subsonic speeds — or generally under flow conditions at high Reynolds numbers — aerodynamic resistance of the fuselage plays an important part which has also an ultimate effect on the operating expenses for the aircraft. On the one hand, a low aerodynamic resistance is desirable. On the other hand, however, the fuselage configuration serves most of all for the accommodation of the service load and should, therefore, permit substantial utilization of the available space. The aerodynamically most favorable slender build of the fuselage, however, does not offer favorable space utilization, so that these requirements are opposed to one another.

Among known fuselage configurations for conventional aircraft are those characterized by a relatively long, cylindrical center portion with either a cylindrical or elliptical cross section and a short bow or tail portion with relatively sharp transition portions in between. The disadvantage of these fuselage shapes is that the air flowing around the fuselage is subjected to great changes in pressure at the transition portions, and, thus, tends to reverse, or separate. This phenomenon, however, is synonymous with aerodynamic resistance.

From basic research (see, for example, Schlichting/Truckenbrodt, Aerodynamics of the Aircraft, Volume 2, 1960),* fuselage configurations are known which have variable cross sections, e.g., ellipsoids of revolution or paraboloids of revolution. The flow conditions of these fuselage configurations exhibit only slight variations in pressure and, thus, have a low aerodynamic resistance. Since the cross section of such a spindle body continuously increases away from the bow along the longitudinal axis in the direction of the longitudinal axis until it reaches a maximum, the continuously increasing flow also assures a continuous decrease of the pressure on the fuselage contour and, thus, the formation of a laminar boundary layer. The aerodynamic resistance of this spindle fuselage configuration is lower than that of a cylindrical body with spherical bow and tail portions, since the flow produces less resistance in the laminar region than in the turbulent region. The problem with this comparatively very slender fuselage configuration is that the substantially smaller cross section in the forward and aft fuselage regions — compared with the conventional cylindrical fuselage design — results in a poor space utilization.

*Springer-Verlag, Berlin/Gottingen/Heidelberg

SUMMARY OF THE INVENTION

It is among the objects of the present invention to eliminate the above-mentioned problems, and to find a fuselage configuration which, under flow conditions at high Reynolds numbers, permits the best space utilization and exhibits low flow resistance. It is a particular object of the present invention to develop a fuselage configuration for aircraft flying at high subsonic speeds which assures, with favorable aerodynamic characteristics, a maximum of space for the installation of a plurality of identically sized elements in a row in the lower fuselage half. Preferably, this intended to mean the accommodation of a plurality of lifting engines.

These and other objects are accomplished, according to the present invention, by providing at least two spindle-shaped geometrical constructions, each of whose major axis is large relative to its minor axis. These geometrical constructions are arranged to pass through one another in such a manner that the total cross section of the fuselage in its longitudinal direction continuously increases from one end of the fuselage until it reaches a maximum value at some point between the two ends of the fuselage and then decreases again toward the other end of the fuselage. This continuous increase in the cross section of the fuselage from the forward end to the maximum point assures a continuous pressure reduction and, thus, a substantially laminar flow along the fuselage contour. By the arrangement, according to the present invention, of two or more spindle-shaped geometrical constructions with their axes parallel, or approximately parallel, so that their surfaces pass through one another along the length of the fuselage, the space utilization which is realized for the fuselage can always be adapted to the prevailing transporting and installation conditions.

BRIEF DESCRIPTION OF THE DRAWINGS

FIG. 1 is a schematic, side elevation view of a fuselage according to the present invention.

FIGS. 2a through 2j are schematic views of the cross section of the fuselage of FIG. 1 taken generally along the lines indicating the stations a through j in FIG. 1.

FIGS. 3a through 3c are schematic top plan, front elevation and side elevation views, respectively, of an aircraft having a fuselage according to the present invention.

DESCRIPTION OF THE PREFERRED EMBODIMENTS

FIG. 1 shows a schematic, side elevation view through a fuselage according to the present invention which is constructed from two spindle-shaped bodies or geometric constructions arranged in overlapping relationships. A construction 1 substantially defines or forms the lower portion of the fuselage and, thus, offers, in addition to a slender forward end, a cross section which is adapted to the intended utilization of the area below the floor of the interior of the fuselage; for example, an elliptical cross section which can be held constant over a large area. See FIGS. 2a through j. A construction 2 is arranged so that its vertical plane of symmetry is in the vertical plane of symmetry of the construction 1. Constructions 1 and 2 define longitudinal axes 3, 4, respectively, which are vertically spaced from one another, axis 3 being below axis 4.

Thus, construction 2 defines or forms most of the upper portion of the fuselage, which portion serves to hold the freight and/or passenger cabins as well as the cockpit. The spacing of the axes of the two geometrical constructions 1 and 2 is determined by the respective cross sections of the two constructions 1 and 2 and the required space allocation of the entire fuselage. It also depends on the transition sections of the individual constructions 1 and 2 at the forward ends thereof and on the conformity of the body contours at the underside of the fuselage. The spacing 5 between axes 3 and 4 may be either greater or smaller at the tail than at the bow. The line 6 shown in FIG. 1 of the drawings represents the penetration curve of the surfaces of the constructions 1 and 2, and is not shown in the aft fuselage region since the slight bend on the fuselage surface will advisably be smoothed out in practice.

FIGS. 2a through j show schematically the cross section of the constructions 1 and 2 at the stations a through j of FIG. 1 of the drawings. As can readily be seen from these figures, construction 1 perferably has an elliptical cross section whose major axis is horizontally oriented and construction 2 preferably has a substantially circular cross section the arrangement being such that the maximum dimension of the major axis of construction 1 is greater than the maximum diameter of construction 2.

FIGS. 3a through c, respectively, show three views of an aircraft having a fuselage whose contours are determined by the penetration of two constructions 7 and 8 in a manner similar to that shown for constructions 1 and 2 in FIG. 1. As is apparent from the drawing, the upper and lower fuselage portions are arranged such that the circular surface of the upper portion and the elliptical surface of the lower portion mutually intersect each other throughout a substantial part of the length of the fuselage. Given the preferably elliptical cross-sectional arrangement of the lower configuration 7, an extremely favorable space utilization is achieved. A plurality of lifting motors 9 can be drawn in and accommodated in a space-saving manner in the lower portion 7 of the fuselage. A plurality of freight containers can also be accommodated in the lower portion 7 in a similar manner to motors 9. The airplane of FIGS. 3a through c, of course, is a VTOL-type aircraft. The forward propulsion means 14 for the aircraft are arranged in a usual manner under the wings 15 of the aircraft.

The substantially circular cross section of the upper portion 8 of the fuselage can, thus, accommodate in a useful manner the passenger and/or freight cabins 11 and the cockpit 12. Because the portion 8 has an elliptical profile at its forward end and a paraboloid of revolution shape where it passes into the lower fuselage portion 7, the required inclination of the windshield 13 for the cockpit 12 is ensured. A change in pressure which would have an unfavorable effect on the aerodynamic resistance of the fuselage should not be expected at this bend, because the continuously increasing cross section in the direction toward the tail will keep the flow substantially laminar. Only in the area of the penetration curve 6 (FIG. 1) will a path of turbulence form, which, however, will not result in any substantial flow resistance.

It will be appreciated that the fuselage portions can assume different cross-sectional configurations than those set out above, while still embracing the present invention.

It will be understood that the above description of the present invention is susceptible to various modifications, changes and adaptations and the same are intended to be comprehended within the meaning and range of equivalents of the appended claims.

What is claimed is:

1. A fuselage for high subsonic speed aircraft, comprising two elongated fuselage portions which are arranged one above the other in longitudinal direction, said upper portion having a surface of an approximately circular cross section and said lower portion having a surface of a cross section which is approximately that of an ellipse having a horizontally oriented major axis, said fuselage portions being arranged such that the circular surface of said upper portion and the elliptical surface of said lower portion mutually intersect each other throughout a substantial part of the length of the fuselage, the maximum dimension of said major axis of said lower portion, in the region of the forward section of the fuselage, being greater than the maximum diameter of said upper portion in said forward section, the total cross-sectional area of both portions increasing continuously in longitudinal direction from the forward end of the fuselage until it reaches a maximum and thereafter decreases continuously in longitudinal direction toward the aft end of the fuselage.

2. A fuselage as defined in claim 1 wherein said lower portion has a forward end which extends beyond that of the forward end of said upper portion, said forward end of said lower portion having a pointed nose.

3. A fuselage as defined in claim 2 wherein said lower portion starts out with a slim, pointed parabolic shape and said upper portion starts out with an elliptical shape.

* * * * *